350-96.21
12/19/78       XR       4,129,932

United States Patent [19]
Stancati

[11] 4,129,932
[45] Dec. 19, 1978

[54] METHOD AND MEANS FOR JOINING ELONGATE MEMBERS

[75] Inventor: Nicholas Stancati, Mountainside, N.J.

[73] Assignee: Thomas & Betts Corporation, Elizabeth, N.J.

[21] Appl. No.: 851,484

[22] Filed: Nov. 14, 1977

[51] Int. Cl.² .......................................... B23Q 17/00
[52] U.S. Cl. ...................................... 29/407; 29/447;
       29/460; 29/463; 264/230; 350/96.21
[58] Field of Search ................. 29/407, 447, 460, 592,
       29/463, 464; 350/96.21, 320; 264/230

[56] References Cited
U.S. PATENT DOCUMENTS

| | | | |
|---|---|---|---|
| 3,513,429 | 5/1970 | Helsop | 29/447 UX |
| 3,544,672 | 12/1970 | Goda et al. | 29/447 UX |
| 3,768,146 | 10/1973 | Braun et al. | 350/96.21 X |
| 3,989,567 | 11/1976 | Tardy | 350/96.21 X |
| 4,019,241 | 4/1977 | Logan | 29/447 X |
| 4,026,633 | 5/1977 | Crick | 350/96.21 |
| 4,043,026 | 8/1977 | Weidhaas et al. | 29/592 |
| 4,050,781 | 9/1977 | Beauhaire | 350/96.21 |

FOREIGN PATENT DOCUMENTS 2456555  12/1976  Fed. Rep. of Germany ........ 350/96.21

*Primary Examiner*—Charlie T. Moon
*Attorney, Agent, or Firm*—David Teschner; Jesse Woldman

[57] ABSTRACT

A splice connector for elongate members such as optical fibers and the like comprises, in one embodiment, a triad of rod-like elements over which is disposed an elongated heat-contractable sleeve the ends of which are provided with a reduced diameter to provide a means for guiding the fibers into the central passageway created within the triad arrangement. The contractable sleeve may be provided as preformed sleeve halves and one of the rods of the triad divided into two parts spaced apart so as to provide an opening coincident with an opening in the sleeve to permit viewing of the interior and the application of sealing material to the splice joint. The distal ends of the reduced diameter portion of the sleeve may be flared outwardly slightly and later heat-contracted about an insulative covering or other protective member disposed about the original elongate member to provide strain relief and clamping means thereat. A further contractable sleeve may be disposed over the assembly to seal and further support the entire connection.

18 Claims, 12 Drawing Figures

METHOD AND MEANS FOR JOINING ELONGATE MEMBERS

BACKGROUND OF THE INVENTION

1. Field of the Invention

The invention is directed to the field of splice connectors for elongate members and the like.

2. Description of the Prior Art

U.S. Pat. No. 4,019,241 issued Apr. 26, 1977 to Maurus C. Logan and assigned to the assignee of the instant invention discloses a splice connector and method of using same for connecting elongate members such as optical fibers and the like, wherein a triad arrangement of cylindrical rods is bundled together by virtue of a contractable sleeve so as to provide a central longitudinal passageway within which the elongate members are held in accurate alignment. However, no provision is made for sealing the connection or for further protecting the portions of the elongate members which extend beyond either end of the connector from bending or breakage which, in the case of optical fibers or like delicate elements, may occur rather easily unless extreme care is taken to provide protection therefor. The increasing use of optical fibers in the medical, communication, and related industries has engendered a need for a simple, inexpensive and rugged connector device which may be assembled without any special care in handling and with relatively simple and inexpensive equipment.

SUMMARY OF THE INVENTION

The invention overcomes the difficulties and limitations noted above with respect to prior art devices by providing a relatively inexpensive, convenient, and rugged method and means for joining elongate members such as optical fibers and the like. The device employs, in one embodiment, a triad arrangement of elongate cylindrical elements about which is disposed an elongate sleeve of heat-contractable material which extends beyond the ends of the bundle of elements and is drawn or necked down to a relatively small diameter at either end to provide a guide for the fibers to be inserted within the connector. Each necked-down portion at either end of the sleeve may terminate in an enlarged flared portion which may then be heat-contracted to grasp the extending ends of the fiber to provide a strain relief, seal, and clamping means thereat. One of the rods within the triad bundle may be divided into two parts and spaced apart so as to expose a portion of the central passageway of the connector to permit viewing the splice joint from the exterior thereof. By providing an opening in the sleeve coincident with the space between the parted rod a sealing material may be introduced into the connector and about the joint. A suitable application of heat to the sleeve will cause the sleeve to laterally contract about both the bundle and the extending ends of the fibers to produce a completed assembly wherein the fiber ends are held securely in place within the interior of the triad bundle and in accurate actual alignment. An additional heat-contractable sleeve may be placed over this assembly to seal the opening in the first sleeve and to provide additional rigidity to the splice connection. It is therefore an object of this invention to provide an improved method and means for joining elongate members.

It is another object of this invention to provide an improved connector for optical fibers and the like.

It is a further object of this invention to provide a rugged, inexpensive, and convenient splice connector for optical fibers and the like.

It is still another object of this invention to provide guide means for an optical fiber connector.

It is yet a further object of this invention to provide combined guide means and strain relief means for an optical fiber connector.

It is still another object of this invention to provide a method of forming a splice connecton for optical fibers and the like.

It is still another object of this invention to provide a simple and inexpensive method of forming a splice connection for elongate members such as optical fibers and the like.

Other objects and features of the invention will be pointed out in the following description and claims and illustrated in the accompanying drawings which disclose, by way of example, the principle of the invention and the best modes contemplated for carrying it out.

BRIEF DESCRIPTION OF THE DRAWINGS

In the Drawings.

Similar elements are given similar reference characters in each of the respective drawings.

DESCRIPTION OF PREFERRED EMBODIMENTS

Figures 1, 1A:
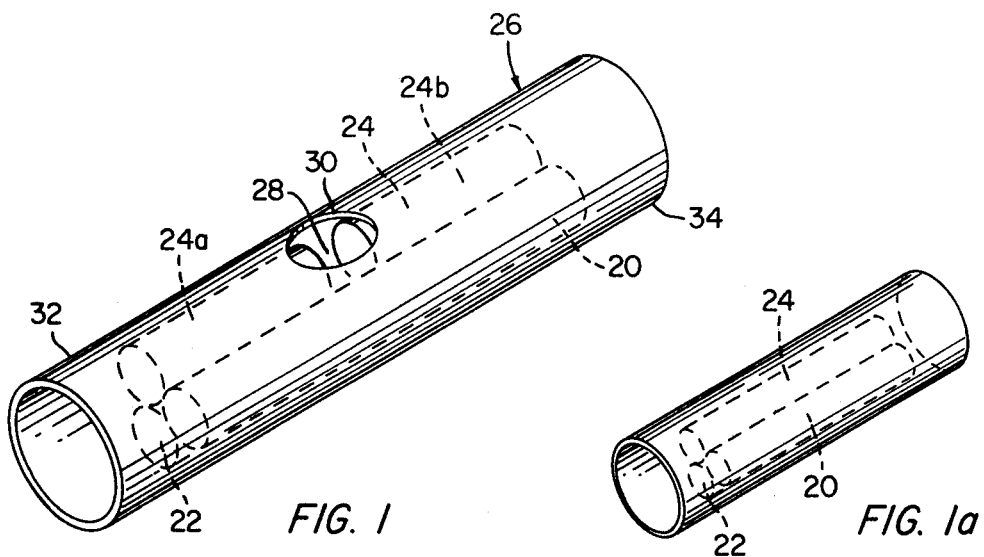
FIG. 1 is a perspective view of a partially complete connector constructed in accordance with the concepts of the invention.
FIG. 1a is a perspective view of a further embodiment of a means for joining elongate members in accordance with the concepts of the invention.

Turning now to the figures, FIG. 1 shows a bundle of three elongate cylindrical elements or rods 20, 22, and 24 in a triad arrangement and about which is disposed a heat contractable sleeve 26. The sleeve 26 may be formed from any one of a number of readily available oriented polymer materials which have been suitably irradiated to induce shrinking or contraction of the material upon heating by any convenient source. The particular material found useful in the instant invention is one in which a high shrink energy is provided in a single direction so that the sleeve 26 will, when subjected to suitable heat, contract laterally with a minimum of longitudinal contraction. Such material, however, may be stretched in the lengthwise direction if sufficient heat is applied thereto to soften the material. As further illustrated in FIG. 1, the rod 24 is shown as divided into two parts 24a and 24b and separated to provide a space 28 therebetween coincident with an opening 30 in the sleeve 26 for purposes which will be described in further detail hereafter. However, it should be noted that, in accordance with the basic principles of the invention, it is not necessary to divide the rod 24 into two parts and, consequently, the opening 30 in sleeve 26 may be eliminated in such arrangement, as shown in the embodiment in FIG. 1a. Each of the rods 20, 22, and 24 is preferably of uniform diameter throughout its length so that the three rods, when placed in juxtaposed parallel orientation, provide a uniformly dimensioned longitudinal passageway through the interior of the bundle coincident with its central axis. The details of such arrangement are adequately described in the above mentioned patent and will not be repeated here. The sleeve 26 is made sufficiently long so as to project beyond the ends of the bundle of rods 22, 24, and 26, to provide end portions 32 and 34.

Figure 2:
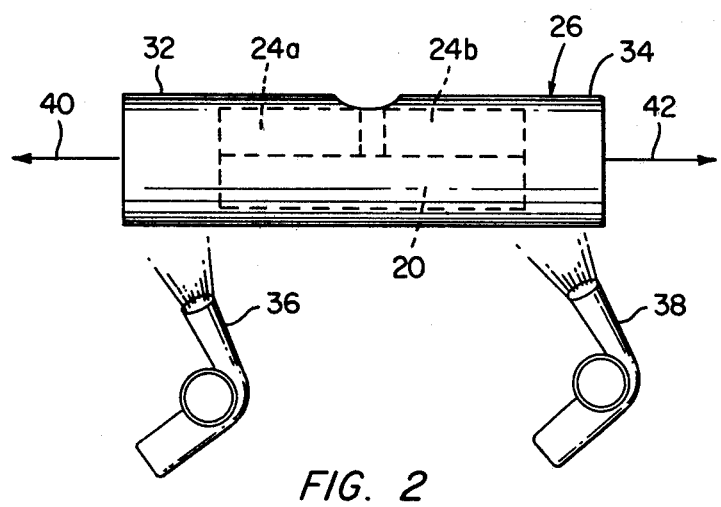
FIG. 2 is a side elevational view of the device of FIG. 1 showing a step in the manufacture of a connector constructed in accordance with the concepts of the invention.

Referring now to FIG. 2, the end portions 32 and 34 of sleeve 26 are heated by any suitable means which, for the sake of illustration, are shown as heat guns 36 and 38, and are simultaneously subjected to opposing longitudinally directed outward forces indicated by the vector arrows 40 and 42. The application of heat to the end portions 32 and 34 should be of sufficient magnitude to permit the end portions 32 and 34 to soften sufficiently to be drawn or extruded in the lengthwise direction with a commensurate reduction in diameter.

Figure 3:
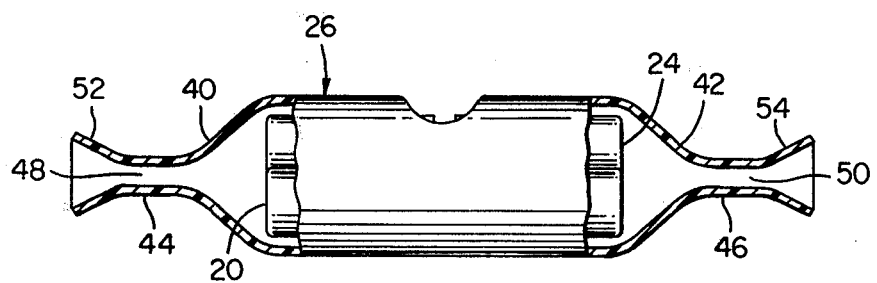
FIG. 3 is a side elevational view, partly cut away and partly in section, showing a further step in the manufacture of a connector in accordance with the concepts of the invention.

The resulting configuration is shown in FIG. 3 wherein the reformed end portions are designated by the numerals 40 and 42 and comprise respective contracted or necked-down portions 44 and 46, each defining an interior opening or passageway 48, 50, respectively, of reduced dimensions relative to the original interior diameter of the end portions 32 and 34. By concentrating the heat in the central area of the end portions 32 and 34, slightly flared terminating ends 52 and 54, respectively, may be provided.

Figure 4:
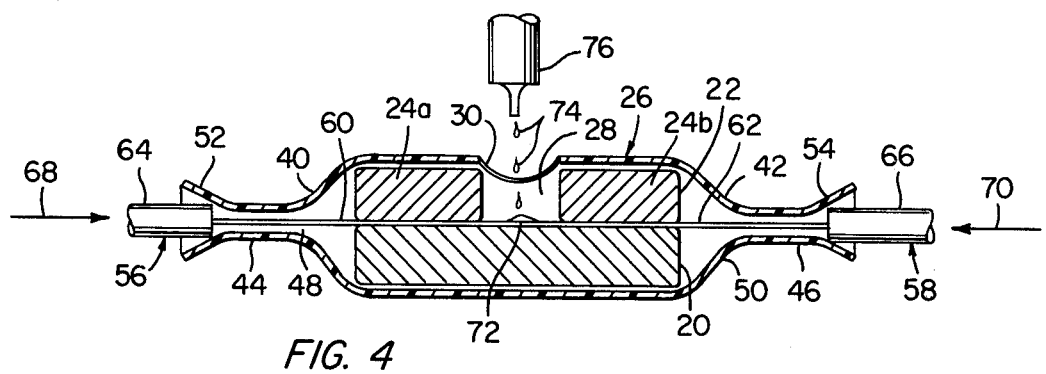
FIG. 4 is a sectional view showing another step in the formation of a connection in accordance with the concepts of the invention.

Referring now to FIG. 4, a pair of elongate members shown partially at 56 and 58 comprise respective bared end portions 60 and 62 from which has been removed an outer sleeve portion 64, 66, respectively. The end portions 60 and 62 are introduced into the interior passageway of the bundle of rods 20, 22, and 24 from either end as indicated by the arrows 68 and 70, through the necked-down openings 48 and 50 which serve as guide means for the ends 60 and 62 which are thus lead into the interior passageway of the bundle of rods 20, 22, and 24. The ends 60 and 62 of the members 56 and 58 are brought into end-to-end facing abutting relationship, as at 72, and are selectively dimensioned in length so that a given length of their outer sleeve portions 64 and 66 is seated within the respective flared ends 52 and 54 of sleeve 26. By way of example, the members 56 and 58 may comprise optical fiber elements in which the outer sleeve or covering 64, 66, respectively, represents a buffer which protects and insulates the internal fiber which may have a diameter of from 0.002 to 0.005 of an inch. The fibers are, consequently, relatively delicate and subject to breakage if not handled with extreme care. The openings 48 and 50 thus provide an extremely useful function in assisting the user in guiding the thin fibers into the axial center of the bundle of rods 20, 22, and 24. In the event the arrangement shown in FIG. 1 is employed, the space 28 between the rod parts 24a and 24b may be utilized to view the joint area at 72 to insure that the ends 60 and 62 of the respective members 56 and 58 are finally located in suitable abutting relationship which, in the case of the joining of optical fibers, is extremely important for minimizing the amount of attentuation across the joint. To further insure the reliability and stability of the joint 72, there may be introduced into the assembly through the opening 30 in the sleeve 26 a sealing material 74 shown as drops emanating from a container 76. The material 74 is allowed to pass through the space 28 between the rod parts 24a and 24b and impinge on the joint 72. Where optical fibers are to be joined, the sealing material 74 may comprise an index-matching fluid having a refractive index corresponding to that of the fibers, such fluid tending to flow into the joint 72 to improve the light transmission therethrough.

Figure 5:
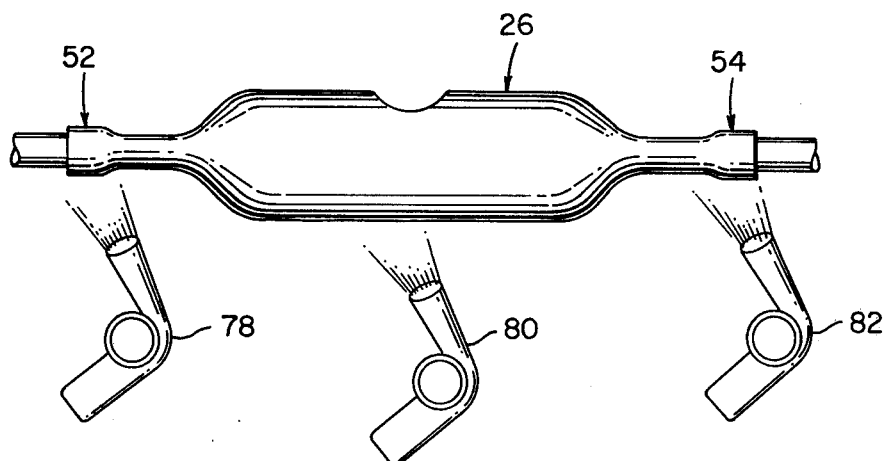
FIG. 5 is a side elevational view showing a further step in the formation of a connection in accordance with the concepts of the invention.
Figure 6:
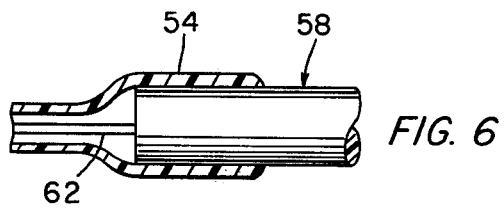
FIG. 6 is a fragmentary section view showing the details of a portion of the connection formed by the step of FIG. 5.

Turning now to FIG. 5, the assembly shown in FIG. 4 is selectively heated, as shown by way of example by the heat guns 78, 80, and 82, to contract the sleeve 26 about the bundle of rods 20, 22, and 24 which are thus brought into tight abutting relationship with the respective ends 60 and 62 of the members 56 and 58. The heat sources 78 and 82 are applied to the flared ends 52 and 54 to contract them about the outer sleeve or covering 64, 66, of the members 56 and 58, respectively, to provide a clamp and seal thereat one end 54 of which is shown in detail in the enlarged view of FIG. 6. It should be understood that in the event the arrangement shown in the embodiment illustrated in FIG. 1a is employed, the step of introducing the sealing material 74 into the assembly, as shown in FIG. 4, is eliminated whereby the ends 60 and 62 of the members 56 and 58 are held in proper abutting relationship by the contraction of the sleeve 26 about the rods 20, 22, and 24.

Figure 7:
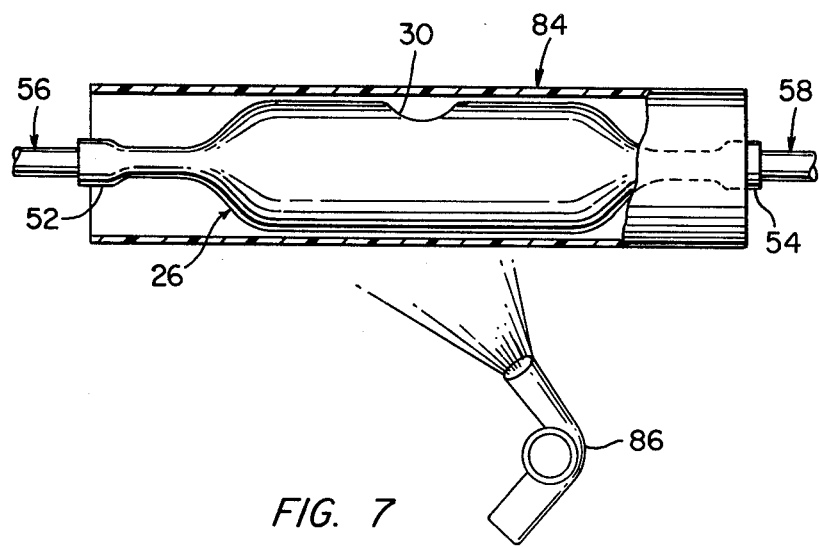
FIG. 7 is a side elevational view, partly cut away and partly in section, of a further step in the formation of a connection in accordance with the concepts of the invention.
Figure 8:
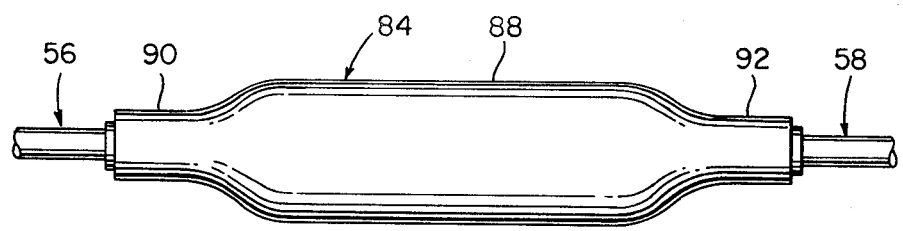
FIG. 8 is a side elevational view showing a connection completed in accordance with the step of FIG. 7.

Turning now to FIG. 7, there is shown an additional contractable sleeve 85 similar to sleeve 28 but slightly larger and arranged to substantially encompass the assembly shown in FIG. 5. The sleeve 84 is shown as extending over substantially the entire length of the contracted sleeve 26 including the end portions 52 and 54. Heat is then applied to the sleeve 84 by means of any convenient heat source shown as a heat gun 86 to contract the sleeve 84 about the inner sleeve 28, as shown in FIG. 8, thereby sealing the opening 30 in the sleeve 26 and providing additional support and protection to the splice assembly. It should be noted that the sleeve 84 is drawn down or contracted in a smooth contiguous line from its central portion 88 towards its end portions 90 and 92 so that the end portions 90 and 92 encompass the necked-down portions 44 and 46 of the inner sleeve 26 to alleviate any bending or torsional stresses which may be applied to the portions 44 and 46.

Figure 9:
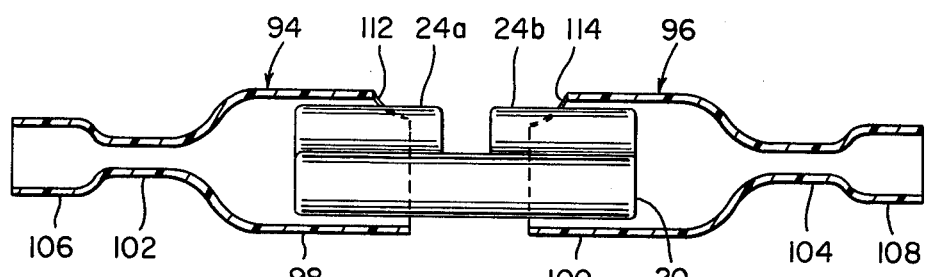
FIG. 9 is a side elevational view, partly in section, of a further embodiment of a connector constructed in accordance with the concepts of the invention.
Figure 10:
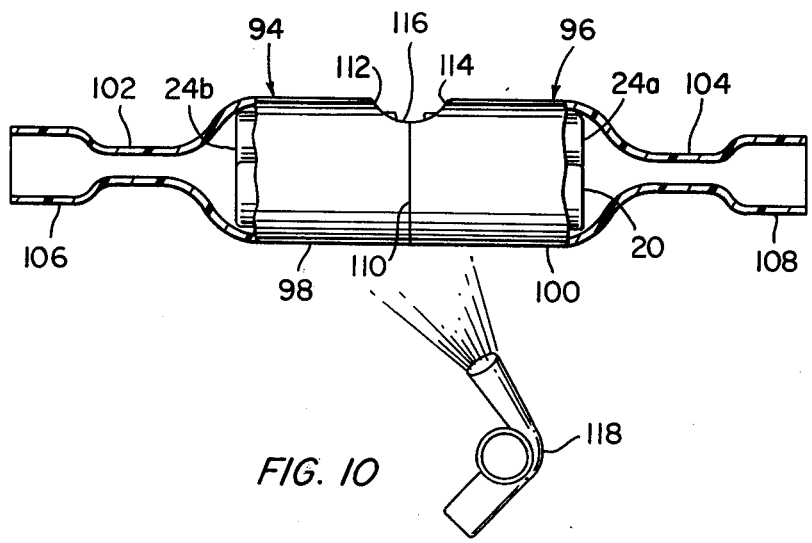
FIG. 10 is a fragmentary side elevational view, partly cut away and partly in section, of a further step in the formation of a connection in accordance with the concepts of the invention.

FIG. 9 illustrates a further embodiment of a method and means for joining elongate members in accordance with the concepts of the invention. In this case, the single heat contractable sleeve 26 shown in FIG. 1 is replaced by two substantially identical preformed, heat contractable half sleeves 94 and 96 each comprising a respective first portion 98, 100, having an inner diameter substantially equal to that of sleeve 26 for encompassing the bundle of rods 20, 22, and 24, the rod 24 being shown as divided into two parts 24a and 24b although, as indicated above, a single rod 24 may be provided thereat where necessary or desirable. Extending coaxially from each first portion 98, 100 of the respective preformed half sleeves 94 and 96 is a necked-down second portion 102, 104, respectively, corresponding generally to the portions 44 and 46 of the sleeve 26, and similarly serving as a guide means for the elongate members 56 and 58. Each second portion 102 and 104 terminates in an enlarged end portion 106, 108, respectively, each of which corresponds generally to its counterpart portion 52, 54, of the sleeve 26. Each of the first portions 98 and 100 has a length slightly greater than one half of the length of the bundle formed by the rods 20, 22, 24a, and 24b and is placed over each end thereof substantially as shown in FIG. 9 and brought together into abutting relationship as indicated by the seam 110 in FIG. 10. Each half sleeve 94 and 96 is shown in FIG. 9 as having a notched portion 112, 114, respectively at a selected location along the edge of each first portion 98, 100, respectively. As the half sleeves 94 and 96 are brought together, the notched portions 112 and 114 are aligned with one another to produce an opening 116 corresponding to the opening 30 in sleeve 26 and serving a similar purpose. When the half sleeves 94 and 96 are in place substantially as shown in FIG. 10, sufficient heat is applied to the first portions 98 and 100 by a convenient heat source shown as a heat gun 118 to cause the first portions 98 and 100 to partially contract about the rods 20, 22, 24a, and 24b sufficiently to prevent the half sleeves 94 and 96 from slipping off the rods 20, 22, 24a, and 24b.

Figure 11:
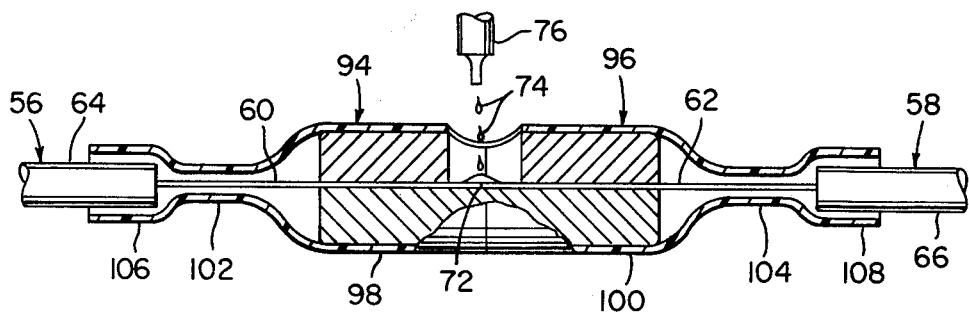
FIG. 11 is a side elevational view in section showing another step in the formation of a connection in accordance with the concepts of the invention.

The remainder of the steps required to complete the splice connection are similar to those described above with respect to FIGS. 4 and 5, which may include the introduction of the sealing material 74 from container 76 to the joint 72 formed by the abutting edges of the end portions 60 and 62 of the elongate members 56 and 58, and the selective application of heat to the assembly shown in FIG. 11 in the manner shown in FIG. 5. Accordingly, the first portions 98 and 100 of the respective half sleeves 94 and 96 will contract about the rods 20, 22, 24a, and 24b and draw them tightly against the end portions 60 and 62 of the members 56 and 58, while the end portions 106 and 108 of the half sleeves 94 and 96 will contract about the respective outer sleeves 64 and 66 of the elongate members 56 and 58 in the manner shown in FIG. 6 to similarly provide a clamp and seal thereat. The end portions 60 and 62 are thus joined and held in accurate coaxial alignment, being supported within the rod bundle and restrained from bending as a result of being encompassed by the respective second portions 102 and 104, and end portions 106 and 108 of the half sleeves 94 and 96. Where necessary or desirable, the outer sleeve 84 shown in FIG. 7 may then be placed over the assembly shown in FIG. 11 and heat contracted thereabout in the manner shown in FIGS. 7 and 8. It should, of course, be noted that the rod parts 24a and 24b may be replaced by a single rod such as 24 where it is neither necessary nor desirable to either view the joint 72 or apply a sealing material thereto. In such case, the notched portions 112 and 114 in the half sleeves 94 and 96 may be eliminated, thus avoiding any exposure of the interior of the connection to external contaminants. It is thus unnecessary to provide an outer sleeve such as 84 for the purpose of sealing the opening 116 since such opening no longer exists in such embodiment. However, it may be found useful to add the outer sleeve 84 to such assembly for additional protection and strength.

The embodiments of the invention in which an exclusive property or privilege is claimed are defined as follows:

1. A connector for elongate members comprising: a bundle of at least three elongate cylindrical elements juxtaposed in parallel orientation to provide an interior passageway coincident with the central axis of said bundle; and a heat contractable member disposed about said bundle for holding said cylindrical elements in close proximate relationship and having end portions extending beyond each end of said bundle, said end portions of said contractable member being heat contracted to provide a reduced interior opening therethrough for guiding said elongate members into said interior passageway.

2. A connector as defined in claim 1 wherein one of said cylindrical elements is divided into two cylindrical parts longitudinally spaced from one another to provide a transverse opening for viewing a portion of said interior passageway.

3. A connector as defined in claim 2 wherein said contractable member is provided with an opening aligned in coincidence with said transverse opening.

4. A connector as defined in claim 1 wherein each of said end portions of said contractable member further comprises clamping means for said elongate members.

5. A connector as defined in claim 4 wherein each of said end portions of said contractable member terminates in an enlarged portion comprising said clamping means.

6. A connector as defined in claim 3 further including an additional contractable member disposed over said contractable member to seal said opening in said contractable member.

7. A connector as defined in claim 1 wherein said contractable member comprises two substantially identical halves arranged in abutting relationship at approximately the center of the length of said bundle.

8. A connector as defined in claim 7 wherein said halves are each preformed to provide a first portion having an inner diameter slightly larger than the diameter of a circle tangentially enclosing said bundle and a second portion having an inner diameter substantially less than said inner diameter of said first portion, said second portion being located beyond the respective end of said bundle.

9. A connector as defined in claim 8 wherein said second portion of each of said halves terminates in an enlarged portion having an inner diameter greater than said inner diameter of said second portion.

10. A method of maintaining selective portions of two elongate members in axial alignment with one another comprising the steps of: providing a bundle of at least three elongate cylindrical elements arranged in parallel axial orientation; providing a heat contractable sleeve having a length greater than said bundle and an inner diameter slightly larger than the diameter of a circle tangentially encompassing said bundle; selectively disposing said sleeve over said bundle so that each end of said sleeve extends beyond a respective end of said bundle; selectively heating each of said ends of said sleeve while applying a longitudinally directed outward force thereto to partially laterally contract and lengthen said ends; guiding the ends of said elongate members through the respective contracted ends of said sleeve; disposing said ends of said elongate members in end-to-end facing disposition adjacent one another within the axial center of said bundle; selectively heating said contractable sleeve along its length to contract said sleeve about said bundle and to further contract said ends of said sleeve about said elongate members.

11. The method as defined in claim 10 further including the steps of: transversely dividing one of said cylindrical elements into two parts spaced from one another; and providing an opening in said contractable sleeve coincident with the space formed between said two parts of the transversely divided cylindrical element to expose a portion of the axial center of said bundle.

12. The method as defined in claim 11 further including the step of aligning said ends of said elongate members within the axial center of said bundle so that the joint therebetween is aligned with said opening in said contractable sleeve.

13. The method as defined in claim 12 further including the step of inserting a sealing material through said opening in said contractable sleeve for sealing the joint between said elongate members.

14. A method of maintaining selective portions of two elongate members in axial alignment with one another comprising the steps of: providing a bundle of at least three elongate cylindrical elements arranged in parallel axial orientation and creating an interior longitudinal passageway; providing a pair of substantially identical preformed heat contractable sleeve halves each comprising a first portion having a length approximately equal to one half of the length of said bundle and positionable thereover, a second contracted portion extending from said first portion and having an inner diameter slightly larger than the diameter of said elongate members, and an enlarged third portion extending from said second portion; positioning said first portion of said preformed sleeve halves over said bundle in abutting relationship; inserting the ends of said elongate members through the respective third portions and second portions of said sleeve halves and into end-to-end facing disposition adjacent one another within the axial center of said bundle; and selectively heating said first portions of said preformed sleeve halves to partially contract said first portions about said bundle and to hold said elongate members seated therewithin.

15. The method as defined in claim 14 further including the step of selectively heating said third portions of said sleeve halves to contract said third portions about the portions of said elongate members seated therewithin.

16. The method as defined in claim 14 further including the steps of: dividing one of said cylindrical elements into two cylindrical parts longitudinally spaced from one another to provide a transverse opening for viewing a portion of said interior passageway to assist in aligning said ends of said elongate members in abutting end-to-end relationship; providing a notched portion on the periphery of said first portion of at least one of said sleeve halves; aligning said notched portion in coincidence with said transverse opening between said parts of said divided cylindrical element; and introducing sealing material to the abutting ends of said elongate members through said notched portion and through said transverse opening between said parted cylindrical element.

17. The method as defined in claim 16 further comprising the steps of positioning an additional heat contractable sleeve over said first portions of said sleeve halves; and selectively contracting said additional sleeve about said first portions of said sleeve halves by heating.

18. The method as defined in claim 16 further comprising the step of heating said sealing material to accelerate the curing thereof.

* * * * *

UNITED STATES PATENT AND TRADEMARK OFFICE
CERTIFICATE OF CORRECTION

PATENT NO. : 4,129,932

DATED : December 19, 1978

INVENTOR(S) : Nicholas Stancati

It is certified that error appears in the above-identified patent and that said Letters Patent are hereby corrected as shown below:

Column 4, line 55, "85" should be -- 84 --.

Signed and Sealed this

Twentieth Day of March 1979

[SEAL]

Attest:

RUTH C. MASON
Attesting Officer

DONALD W. BANNER
Commissioner of Patents and Trademarks